United States Patent Office 3,796,595
Patented Mar. 12, 1974

3,796,595
SUBSTITUTED AROMATIC COMPOUNDS
Joseph David, Keith Thomas, and Nand Kishore, Welwyn Garden City, England, assignors to Catomance Limited, Welwyn Garden City, England
No Drawing. Filed Jan. 12, 1971, Ser. No. 105,972
Claims priority, application Great Britain, Jan. 16, 1970, 2,274/70
Int. Cl. D06m 13/00
U.S. Cl. 117—138.5          2 Claims

ABSTRACT OF THE DISCLOSURE

A method of preserving wet articles from biodegradation which comprises maintaining contact between the wet articles and an aqueous solution or colloidal dispersion of a water soluble salt of an ester of sulfuric, orthophosphoric, or pyrophosphoric and phosphorous acids wherein at least one hydroxyl group is esterified by an aryloxy isopropanol group.

---

This invention relates to methods and compounds for preserving articles against biodegradation, that is to say spoilage by microorganisms such as bacteria and fungi. Phenols and substituted phenols have been used for many years for this purpose, pentachloro phenol having been of particular value in industrial applications. The phenols have either been used in the form of free phenols or as their salts or as esters with carboxylic acids, the esters with mixtures of carboxylic acids containing about 14 carbon atoms being particularly useful. However all these compounds have physical properties that severely limit the scope of their possible uses and makes their handling inconvenient and in some instances very unpleasant. Thus many of the compounds, particularly the free phenols, are highly volatile and substantially all the esters are insoluble in water.

It has been our object to devise biocidal methods in which the active ingredient is either soluble or very easily dispersed in water in order that most or all of the disadvantages of the known phenolic biocides could be overcome. It has also been our object to produce new biocides.

According to the invention an article is preserved from biodegradation by contacting the article before or during attack by a microorganism with a water soluble or dispersible compound which is an ester of sulphuric, orthophosphoric, pyrophosphoric or phosphorous acid in which at least one hydroxyl group of the acid is esterified by an aryloxy ethanol or aryloxy propanol group, any other hydroxyl group or groups in the acid being free, or a salt thereof.

Most of the compounds suitable for use in the invention are new compounds but some of the compounds are known, and closely related compounds are known, for other purposes. So far as we are aware it has never been realized that esters could be formed between the aryloxy alkanols and the specified inorganic acids which have more satisfactory physical properties and yet which retain the biocidal activity, or in some instances even have better biocidal activity, than the phenols from which they are derived.

Most of the known compounds are aryloxy ethanol esters with one of the acids, usually sulphuric acid, and are alleged to be of value as hormone herbicides. The substitution in the aryl group was therefore usually of the conventional hormonal type substitution, for example 2-methyl-4-chloro, 2,4-dichloro and 2,4,5-trichloro substitution. Herbicides containing phenoxy ethyl phosphites and phosphates having substitutions of this type and being herbicides are described in British patent specifications Nos. 734,824 and 871,676. A rather wide range of sulphates is described in British patent specification No. 798,476 and in U.S. patent specification No. 2,573,769.

Very few phenoxy propyl compounds have been described in the literature although two sulphates, again with hormonal type substitution, have been tested as herbicides, namely 2,4-dichloro phenoxy propyl sulphate and 2,4,5-trichloro phenoxy propyl sulphate.

A large number of closely related compounds in which the ethanol or propanol group is replaced by a recurring oxy-ethylene group are known and are generally described for their surface active properties, and in practice this always necessitates there being a rather large number of oxyethylene groups present. The presence of recurring oxyethylene groups reduces the biocidal activity of the compounds.

Preferred biocides for use in the invention can be represented by the formula $(ArOR)_nX$ where Ar represents an aryl group and R represents an ethyl or propyl group. The propyl may be normal propyl or isopropyl, the latter being preferred, $n$ is an integer from 1 to 4. When $n$ is 1 X may be $H_2PO_4$, $H_2PO_3$, or $HSO_4$, when $n$ equals 2 X may be $HPO_3$, $HPO_4$ or $H_2P_2O_7$, when $n$ equals 3 X may be $PO_3$ or $PO_4$ and when $n$ equals 4 X may be $P_2O_7$. It is convenient to illustrate these values as follows:

Phosphates

When

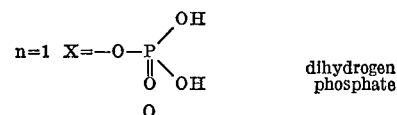

dihydrogen phosphate

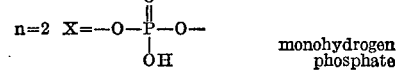

monohydrogen phosphate

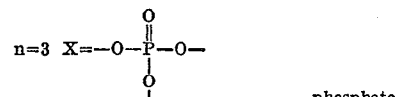

phosphate

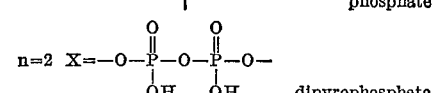

dipyrophosphate

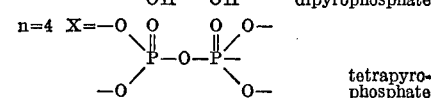

tetrapyrophosphate

Phosphites

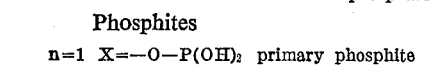

primary phosphite

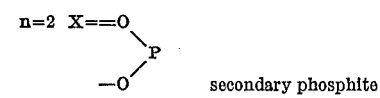

secondary phosphite

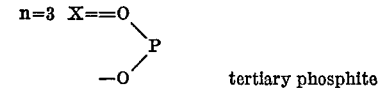

tertiary phosphite

Sulphate

Most of the formulae shown above include hydroxyl groups that are free, i.e., they are not etherified or esterified. Hydroxyl groups not substituted by an aryloxy ethanol or aryloxypropanol need to be free in this manner since if they are etherified or esterified, e.g., with a glycol, either the physical properties, such as solubility, or the biocidal properties, or both, are usually impaired. Salts may, however be formed. Preferred salts are alkali metal salts, e.g., potassium and sodium, ammonium salts, amine salts, e.g., triethanolamine or morpholine or amino methyl propanol or other amine salts and, in some instances, alkaline earth metal salts. Some alkaline earth metal salts are insoluble and/or difficultly dispersible in water in which event they cannot be so easily applied, but some salts of, e.g., calcium and magnesium, may be adequately soluble or dispersible, at least in low concentrations.

The use of quaternary ammonium salts, and also sometimes the use of amine salts, can be advantageous in that it improves the bactericidal properties of the compounds, as compared to the free acid form of the compounds.

In all these compounds the group Ar is an aryl group. This may be a phenyl group or a naphthyl group, which may be substituted or unsubstituted. Substituents that are present in the phenyl or naphthyl group can be any of the substituents that are acknowledged as being desirable in biocidal phenols, being for example chloro, bromo, nitro, hydroxy, aryl, $C_1$–$C_3$ alkyl, cycloalkyl, (usually $C_5$–$C_8$), aralkyl, and acyl, e.g., salicyl. When the substituent is aryl then the aryl substituent may itself be, for example, a phenyl group which may be substituted with any of the substituents listed above for the substituents on Ar. The preferred alkyl group is methyl although it may be ethyl or propyl. The preferred aralkyl group is benzyl, although it can be for example an aralkyl group that is itself part of an aryloxy alkanol. Thus, it may be, for example, a bis-propanoloxy diphenyl alkane.

It is often preferred that there should be more than one substituent in which event the substituents may be the same or different.

Preferred biocides include compounds in which Ar represents 1-chloro-2-naphthyl, unsubstituted phenyl, phenyl substituted by from 1 to 5, preferably 2 to 5, bromine atoms, 4 or 5 chlorine atoms, 3 chlorine atoms provided they are in the 2, 4 and 6-positions (the 2, 4, 5-positions are not so satisfactory), nitro (especially para-nitro), a phenyl radical, a benzyl radical, a hydroxyl radical, or substituted by a combination of halogen atoms, generally chlorine, with alkyl, generally methyl, cycloalkyl or hydroxyl, or in which ArOR represents a 4,4′-bis-propanoloxy diphenyl alkane.

Particularly preferred biocides are those in which Ar represents a phenyl group which is substituted by 2,4-dibromo, 2,6-dibromo, 2,4,5-tribromo, 2,4,6-tribromo or -trichloro, 2,4,5,6-tetrabromo or -tetrachloro, pentabromo, pentachloro, 2-phenyl, 2-phenyl-4-chloro, 2-benzyl-4-chloro, 3,5-dimethyl-2,6-dichloro, 3,5-dimethyl-4-chloro, 3-methyl-4-chloro, 2-hydroxy, 3-hydroxy, 2-hydroxy methyl, or 2-cyclopentyl-4-chloro. A preferred 4,4′-bis-propanoloxy diphenyl alkane is 2,2′-di-propanoloxy-5,5′-dichloro diphenyl methane.

In all these compounds the aryloxypropanol is preferably a 1-aryloxy-2-propanol and all the preferred compounds are novel compounds.

Particularly preferred compounds are the esters with pentachlorophenoxy isopropanol, 2,4,6-trichloro phenoxyisopropanol (often in admixture with the pentachloro compound), o-phenyl-phenoxyisopropanol and 2,2′-dipropanoloxy-5,5′-dichloro diphenyl methane. The esters which are easiest to obtain are the sulphates, preferably the ammonium sulphates, and so these are preferred.

The biocides are conveniently made starting from the corresponding aryloxy alkanols. These may be made from the corresponding phenols by methods known from the literature, for example, as described in U.S. specification No. 2,416,263 or French specification No. 1,386,347. A particularly preferred way of making the aryloxy isopropanols is described in our application No. 105,973, filed even date herewith Jan. 12, 1971. This method comprises, broadly, mixing a tertiary amine catalyst with propylene oxide or the phenol and then adding the other reactant (either the phenol or propylene oxide) to the mixture which is anhydrous, and maintaining the mixture at an elevated temperature below about 110° C.

The sulphates can be made simply by reacting the hydroxy compound with sulphuric acid or chlorosulphonic acid. Substantially equimolar amounts of reactants are usually used. The reaction may be conducted in the presence of an inert solvent, for example toluene. The reaction is generally exothermic and should generally be cooled, for example to a temperature below 55° C., in order to prevent undesirable dehydration side reactions occurring. The reaction product can be neutralized with an appropriate base to form a salt.

The ammonium salt can, however, be formed direct by reacting the hydroxy compound with sulphamic acid. The amount of sulphamic acid is usually substantially equimolar, for example, possibly being slightly above equimolar. The reaction may be conducted in the presence of an inert solvent, for example toluene. It is generally conducted at an elevated temperature, for example 70 to 110° C. The free acid form of the ester, or other salts of the ester, can be obtained from the resultant ammonium salt if desired. This reaction with sulphamic acid is the preferred method of making the sulphates since it is very easy to conduct and gives an excellent yield, the reaction product usually being useable without any purification step.

The phosphates can be made by reacting the corresponding hydroxy compound with phosphorous pentoxide or phosphorous oxychloride. When phosphorous pentoxide is used the product is usually a mixture of all five phosphates, although the exact proportions of the phosphates will depend, at least in part, upon the particular reaction conditions selected. Usually substantially stoichiometric amounts of phosphorous pentoxide and the hydroxy compound are used. The reaction may be conducted in the presence of an inert solvent, for example toluene, and may be conducted at an elevated temperature, for example 50 to 110° C. It is not usually necessary to separate the various phosphates and thus the resultant mixture of phosphates can be used as biocide. However if it is desired to separate them into individual compounds this may be achieved by conventional methods, for example chromatography.

Ths phosphates can also be made by reaction with phosphorous oxychloride, the reaction generally being exothermic and requiring cooling. The use of phosphorous oxychloride tends to give a product consisting mainly of phosphate, mono hydrogen phosphate and dihydrogen phosphate and the proportion of the three materials can be controlled, to some extent at least, by appropriate selection of the molar ratio of phosphorous oxychloride to the hydroxy compound. For example equimolar amounts tend to produce the dihydrogen phosphate while greater amounts of the hydroxy compound will tend to increase the proportion of monohydrogen phosphate.

The phosphites can be made by reacting the corresponding hydroxy compound with phosphorous trichloride. The reaction mixture generally needs to be cooled. The reaction may be conducted in the presence of an inert solvent, for example toluene. A mixture of the various phosphites is generally obtained, the proportions of the phosphites being controlled, at least in part, by the proportions of the reactants used. Generally the mixed phosphites can be used as biocides without it being necessary to separate them from one another. However if separation is required it may be conducted by conventional techniques, for example chromatography.

The introduction of the sulphate, phosphate or phosphite group renders the compounds soluble in water or at least much more easily dispersible in water than the corresponding phenols, phenol salts, phenol esters or phenoxy alkanols. Most of the compounds used in the invention form true solutions of water. Those that do not form true solutions form aqueous dispersions, for example colloidal solutions or suspensions, in the absence of dispersing agent. This is a particularly desirable improvement over the corresponding biocides used previously in that it is now very easy to obtain either from the pure compound or from an aqueous concentrate of it a dilute biocidal solution or dispersion, simply by adding water. For example the compound may be an oil which can readily be formulated as a concentrate, having the form of a gel, by adding 30 to 50% water and this gel can readily be diluted with further water to form a dilute colloidal suspension or a true solution.

The solutions or dispersions have the advantage that they are stable over a wide pH range, whereas phenols or phenoxy alkanols that could be solubilized could generally only be solubilized over a narrow pH range.

The compounds are much more convenient to handle than the corresponding phenols. The compounds also have little or no unpleasant odor, whereas the corresponding phenols may have a very undesirable odor.

The compounds are generally oils, although some, in particular the pentachloro substituted compounds, are low melting solids and are preferably formulated with other of the biocidal compounds which are oils, thereby producing an oil containing both compounds.

The provision of the sulphate, phosphate or phosphite groups may also have a beneficial effect on the preservative activity of the compounds both as compared to the corresponding phenols or salts or esters and as compared to the corresponding phenoxy alkanols in which there is a hydroxy group in place of the sulphate or other group present in the new compounds. In general it can be said that the introduction of the sulphate, phosphate or phosphite group often broadens the spectrum of activity compared to the corresponding phenols and phenol salts, esters and alkanols.

In addition to being effective bactericides and fungicides compounds of the invention may also be useful as insecticides.

All the compounds are valuable as preservatives against biodegradation and all have some useful activity against most forms of biodegradation. Naturally the particular activity of each compound depends upon the particular combination of substituents in the compound. The aryl group seems to be of most significance in influencing the optimum field of activity of each compound and in general this field of activity will be the same as the optimum field of activity of the corresponding phenol. For example when the compound contains, as the group Ar, the phenyl radical of a phenol that has optimum activity as a fungicide then the new compound will generally have optimum activity as a fungicide.

The compounds are of fairly low persistance and so do not present any serious health hazard of the type presented by, for example, DDT and Dieldrin. However, it is possible readily to insolubilize the compounds from an aqueous medium containing them and to separate the precipitated material out from the medium. Thus a trade effluent containing soluble compounds according to the invention can have added to it polyvalent metal salts capable of forming insoluble salts with the compounds of the invention and the insoluble salts are then removed from the effluent. Salts with aluminium, zirconium, copper, lead and mercury are examples of insoluble salts that may be formed in this way. As an example, effluent from a works where a solution of one of the compounds has been used for impregnating a material, for example carpet fibre, can have aluminium sulphate added to it and the resultant precipitate separated from the effluent which, as a result, is substantially free of the toxic compound.

The ability to precipitate out salts of the compounds affords a convenient way of applying the compounds to materials, for example paper or textiles. Thus a solution of the soluble compound can be applied to the materials, for example by impregnation, and the compound then precipitated out onto the paper by adding a material forming an insoluble salt, such as aluminium sulphate.

Fungicidal and bactericial compositions according to the invention comprise the compounds together with a carrier. The carrier may be an inert solid, the compositions then, for example, being in the form of tablets or powders. Preferably, however, the compositions are liquids and the carrier is preferably water. Thus compositions are usually aqueous solutions or colloidal dispersions or solutions. Although the compounds are water soluble or dispersible, i.e. dispersible in water in the absence of a surface active agent, the composition may include a small amount of surface active agent or dispersion stabilizer.

Depending upon the purpose of the compositions and whether the compositions are in the form of a concentrate or not the compositions may contain from 0.01 to 90% by weight. For most applications the preferred concentration is from 0.1 to 5%.

As indicated above it is not necessary to purify one particular compound from a reaction product and thus the compositions may contain from 0.1 to 90% by weight of a mixture of the phosphates or phosphites, or of the sulphate.

The biocides may be applied to the articles to be protected either before attack by a microorganism or during attack. The compounds preserve from spoilage a wide variety of articles. Thus the articles may comprise textile fibres and the compounds may be applied to the article when it is in the form of a sheet, for example a carpet or textile material, from which the fibres are formed or may be applied to the fibres before their formation into the sheet, for example when in loose fibrous form or in the form of yarn or roving. The articles may be carbohydrates, for example being based on cellulose. Thus paper, paper fibres, starches, timber and chip board can be protected. The article being protected may very conveniently be an aqueous suspension of paper fibres, and thus the biocides have wide application in the paper manufacturing industry. Previously many of the biocides that could be used on paper making machinery were very toxic and unpleasant to handle. Other valuable articles that can be protected by the invention are leather articles. Phenolic biocides have not generally been conveniently applicable to leather because they could only be applied to leather at pH values which usually detrimentally affected the leather. However it is now possible to select the pH of the treatment to the requirements of the leather rather than to the requirements of the biocide. Other articles that can be protected include foodstuffs, adhesives and emulsions, especially emulsion paints.

The compounds are valuable as additives to water suspensions of earths, especially bentonite, used in, for example, oil drilling to protect against the development of bacteria. The compounds are also of value in the control of odors formed in perspiration by inhibiting the development of odor forming bacteria and may be applied to garments or shoes for this purpose. The compounds have surface active properties and are useful in the formulation of antiseptic mixtures and disinfectants. Thus aqueous solutions or dispersions containing one or more of the compounds of the invention as the sole active ingredient may be used as antiseptics and disinfectants. Other active ingredients may be mixed into the compositions.

A particular advantage of the compounds is that they are capable of being dyed onto woolen or leather materials. Thus they can be applied in the dye bath, conveniently simultaneously with application of a true color dye to the material. For example dye baths containing sodium sulphate and sulphuric or formic acid, for example 10% sodium sulphate and 2% sulphuric acid, can contain 0.2 to 5% of the compounds. The percentages are based on the weight of wool or leather material. Satisfactory results are achieved when the material is immersed in the bath with agitation for at least 10 minutes at a liquor to goods ratio of from 2 to 50 parts, preferably 10 parts, liquor to 1 part goods by weight. This method is particularly useful for treating textiles made of wool. Useful effects can however be obtained by simple application of the compounds onto a wide range of substrates. For example the compounds may be applied by immersion or spraying onto wool or other textile fibres, for example paper fibres, cotton fibre, jute fibres and manmade fibres before fabrication into paper sheets or textiles or during or after fabrication.

The following are some examples of the invention. In Examples 1–10 the product was in each case analyzed and its structure determined by Infra Red analysis and standard analytical methods. In the remaining examples each test was carried out under non sterile conditions.

EXAMPLE 1

Pentachlorophenoxy isopropyl sulphate

Sulphuric acid Sp. Gr. 1.84 (0.2 mole) was slowly added to pentachlorophenoxy isopropyl alcohol (0.2 mole) with stirring, the temperature being maintained below 55° C. by means of external cooling.

When the sulphuric acid addition was complete stirring was continued until a test sample of the reaction mixture became water dispersible.

Cold water (120 gm.) was added with stirring and a fawn colored paste was formed, which on neutralizing with 50% sodium hydroxide and adjusting the pH to approximately 8.0 gave a brown colored solution, dispersible in water and containing 37.3% of sodium pentachlorophenoxy isopropyl sulphate.

The corresponding potassium salt was obtained as a 25% solution in a separate experiment when potassium hydroxide was used in place of the sodium hydroxide.

By a similar method, but replacing the 0.2 mole pentachlorophenoxy isopropyl alcohol with 0.2 mole of a different aryloxy ethanol or propanol there may be obtained aqueous solutions of the corresponding sulphates.

The sodium pentachloro phenoxy isopropyl sulphate was isolated in pure form by converting it to the acid, dissolving it in aqueous alcohol, neutralizing with sodium hydroxide, filtering, and repeatedly recrystallizing from aqueous alcohol, and finally by rotary film evaporation. The elemental analysis of the product was:

Found (percent): Cl, 38.96; H, 1.44; C, 24.33; S, 7.40. Theory (percent): Cl, 41.62; H, 1.40; C, 25.32; S, 7.50.

The product was also analyzed by infra red spectrography. Peaks were observed in the band between 620 and 800, being indicative of chlorine, 1150 to 1200 being indicative of the radical alkyl —O—SO$_3^-$, and 1380 to 1400, being indicative of the group CH$_3$CH—.

EXAMPLE 2

Pentachlorophenoxy isopropyl phosphates

To 0.1 mol of pentachlorophenoxy isopropyl alcohol was added 0.05 mol of anhydrous phosphorous pentoxide with continuous stirring. Slowly the temperature was raised to 110° C. and kept there for about 2 hours. It was then cooled to about 55° C. and was neutralized with 51% alkali, care being taken to keep the temperature below 60° C. The product was a mixture of mono hydrogen and dihydrogen phosphate and di- and tetra-pyrophosphate.

By replacing the 0.1 mole of pentachlorophenoxy isopropyl alcohol with 0.1 mole of another aryloxy ethanol or propanol there may be obtained the corresponding phosphates, each being a mixture of mono- and dihydrogen phosphate and di- and tetra-pyro phosphate. Infra red analysis of the product showed peaks between 650 and 800, indicative of chlorine, between 1100 and 1150, indicative of the group alkyl=P, at 1260, indicative of the group P=O and at 1380 to 1400, indicative of the group CH$_3$CH—.

EXAMPLE 3

Pentachlorophenoxy isopropyl phosphites

To 0.1 mol of pentachlorophenoxy isopropanol was added 0.1 mol of phosphorous trichloride slowly with stirring. After the addition the mixture was stirred for another hour, cooled and neutralized with 50% alkali.

The product was a mixture of the primary, secondary and tertiary phosphites. By replacing the 0.1 mole of pentachloro phenoxy isopropanol with 0.1 mole of another aryloxy ethanol or propanol there may be obtained the corresponding phosphites.

Infra red analysis of the product showed peaks between 650 and 800, indicative of chlorine, at 1010, indicative of the group alkyl —O—P, i.e. a phosphite, and at 1380 to 1400, indicative of CH$_3$CH—.

EXAMPLE 4

Pentachlorophenoxy isopropyl ammonium sulphate

To 0.2 mol pentachlorophenoxy isopropanol was added 0.22 mol of sulphamic acid. The mixture was heated to 110° C. with stirring for 2 hours. The resultant reaction mixture was cooled to 50° C. and neutralized with diethanolamine and the product diluted with water to give a brown turbid liquid containing 25% of pentachlorophenoxy isopropyl ammonium sulphate. This was dispersible in water. The free acid was purified as in Example 1. The elemental analysis was:

Found (percent): C, 25.13; H, 2.55; N, 3.40; S, 7.72; Cl, 39.84. Theory (percent): C, 25.62; H, 2.375; N, 3.321; S, 7.591; Cl, 42.11.

By replacing 0.2 mole pentachlorophenoxy isopropanol with 0.2 mole of another aryloxy isopropyl there have been obtained by this method the isopropyl ammonium sulphates of 2,4-dibromo phenol, 2,6-dibromo phenol, 2,4,5-tribromo phenol, 2,4,6-tribromo phenol, 2,4,6-trichloro phenol, 2,4,5,6-tetrabromo phenol, 2,4,5,6-tetrachloro phenol, pentabromo phenol, pentachloro phenol, 2-phenyl phenol, 2-phenyl-4-chloro phenol, 2-benzyl-4-chloro phenol, 3,5-dimethyl-2,6-dichloro phenol, 3,5-dimethyl-4-chloro phenol, 3-methyl-4-chloro phenol, 2-hydroxy phenol, 3-hydroxy phenol, 2-hydroxymethyl phenol, and 2-cyclopentyl-4-chloro phenol and 2,2'-dihydroxy-5,5'-dichloro diphenyl methane.

EXAMPLE 5

2:4:6-trichlorophenoxy isopropyl sodium sulphate

Sulphuric acid Sp. Gr. 1.84 (0.2 mole) was slowly added to 51.1 g. (0.2 mole) of 2:4:6 trichlorophenoxy isopropyl alcohol with stirring, the temperature being maintained below 55° C. by means of external cooling.

When the sulphuric acid addition was complete, stirring was continued until a test sample of the reaction mixture became water dispersible.

The mixture was cooled and neutralized with triethylamine, diluted with water and sodium chloride solution was added to it, and the product was precipitated out. It was filtered, washed several times with sodium chloride solution and then with n-hexane and dried. The product was completely soluble in water and was 2:4:6 trichlorophenoxy isopropyl sodium sulphate.

Analysis of the purified product by infra red showed peaks in the band 650 to 800, indicative of chlorine, a peak at 1210, indicative of —C—O—SO$_3^-$ and a peak at 1400, indicative of CH$_3$CH.

EXAMPLE 6 o-Phenyl phenoxy isopropyl sodium sulphate 22.8 g. (0.1 mole) o-phenyl phenoxy isopropyl alcohol was dissolved in chloroform (40 ml.) in a three neck flask, fitted with water condenser and stirrer. 10.1 g. triethylamine was added to it while stirring and then 12.3 g. (0.11 mole) of chlorosulphonic acid was added and the mixture was stirred for about 4 hours at about 40° C. It was cooled, diluted with water and the salt precipitated out as sodium salt with sodium chloride solution, washed with sodium chloride solution several times and then with ether. The product was completely soluble in water and was o-phenyl phenoxy isopropyl sodium sulphate.

Elemental analysis of the purified product showed:
Found (percent): C, 54.20; H, 4.53; S, 9.72. Theory (percent): C, 54.55; H, 4.545; S, 9.696.

EXAMPLE 7

2:4:6 trichlorophenoxy isopropyl dihydrogen phosphate 15.4 g. (0.1 mole) phosphorous oxychloride was mixed with 20 ml. of dry ethyl ether and 10.1 g. (0.1 mole) of triethylamine was stirred into it while maintaining the temperature below 20° C. 25.5 g. (0.1 mole) of 2:4:6 trichlorophenoxy isopropanol was dissolved in 40 ml. diethyl ether and added to the above mixture while stirring and maintaining the temperature below 20° C. It was stirred for about four hours, cooled and filtered. Ether was evaporated. Low boiling fractions were boiled off under reduced pressure. The product remaining in the flask was reacted with water to give the dihydrogen phosphate. For commercial purposes, the purification with diethyl ether and triethylamine is unnecessary since the impure product can be utilized.

EXAMPLE 8

Bis(o-phenyl phenoxy isopropyl) monohydrogen phosphate 7.7 g. (0.05 mole) phosphorous oxychloride was mixed with 20 ml. of dry ethyl ether and 10.1 g. (0.1 mole) of triethylamine was stirred into it while maintaining the temperature below 20° C. 22.8 g. (0.1 mole) of o-phenyl phenoxy isopropanol was dissolved in 40 ml. diethyl ether and added to the above mixture while stirring and maintaining the temperature below 20° C. It was stirred for about 4 hours, cooled and filtered. Ether was evaporated low boiling fractions were boiled off under reduced pressure. The product remaining in the flask was reacted with water to give the monohydrogen phosphate. It was purified by recrystallization.

EXAMPLE 9

Tri(o-phenyl phenoxy-isopropyl)-phosphate 5.1 g. (0.033 mole) phosphorous oxychloride was added to a mixture of 22.8 g. (0.1 mole) of o-phenyl phenoxy isopropanol and triethylamine 10.1 g. (0.1 mole) in chloroform. The mixture was refluxed for about 4 hours when evolution of HCl gas ceased. The mixture was poured on ice and filtered and dried and recrystallized.

EXAMPLE 10

Pentachlorophenoxy isopropyl phosphite 15 g. (0.11 mole) phosphorous trichloride and 40 ml. diethyl ether were mixed in a three neck flask fitted with water condenser and quickfit dropping funnel. 10.1 g. (0.1 mole) triethylamine was added to it while stirring and 32.4 g. (0.1 mole) pentachlorophenoxy isopropanol in 30 ml. ether was added to it slowly while stirring and maintaining the temperature below 10° C. After about 4 hours, the mixture was filtered and ether was evaporated. Low boiling fractions were boiled off under reduced pressure. The product remaining in the flask was reacted with water to give the phosphite. It was purified by recrystallization.

In a similar manner, bis(o-phenyl phenoxy isopropyl) phosphite, and tri(o-phenyl phenoxy isopropanol) phosphite were prepared.

EXAMPLE 11

A sample of leather was treated substantively with 1% of the potassium salt of o-phenyl phenoxy isopropyl phosphate by immersing the leather in a bath containing 1% of the compound in aqueous dispersion, based on the dry weight of leather at a liquor to goods ratio of 5:1 and agitating for a period of 10 minutes. The treated leather, together with an untreated control, whilst still in a wet state, were then installed on mineral agar in Petri dishes, infected by spraying with a spore suspension of the following organisms, *Asperigillus tamaril, Cladesporium sphaerospermum, Chaetomium globosum* and a species of Stemphylium and incubated at 30° C. for 7 days. At the end of this time the untreated control had developed profuse mould growth whilst the treated sample was unaffected.

EXAMPLE 12

A strip of beechwood veneer was immersed for 15 seconds in a 5% aqueous dispersion of the potassium salt of pentachlorophenoxy isopropyl phosphate and the excess liquid removed with blotting paper. An untreated control was treated in a similar manner in water only. The samples were then installed in mineral agar in Petri dishes and sprayed with a suspension of the same organisms as in Example 11. After 7 days incubation at 30° C. the untreated sample had developed profuse mould growth on the surface whereas the treated sample was unattacked.

EXAMPLE 13

To a sample of rubber latex was added 1% of a mixture containing 70 parts of the potassium salt of pentachlorophenoxy isopropyl sulphate and 30 parts of the potassium salt of o-benzyl-p-chlorophenoxy isopropyl sulphate. This, together with an untreated control was infected and incubated at 30° C. as described in Example 11 and after 7 days profuse mould growth had developed on the untreated control whilst the treated latex was unaffected.

EXAMPLE 14

A bleached softwood sulphite pulp was disintegrated at 2.25% consistency and then beaten at 1.57 to S.R. 49.

To this pulp was added 0.1%, on the dry weight of pulp, of an aqueous dispersion containing 70 parts of the ammonium salt of pentachlorophenoxy isopropyl sulphate and 30 parts of the ammonium salt of o-phenyl phenoxy isopropyl sulphate and the mixture agitated for 5 minutes. A further addition was then made of 4% of aluminium sulphate on the dry weight of pulp and agitation continued for a further 5 minutes. A number of test papers were then made with the resultant treated pulp and a corresponding number with the addition of aluminium sulphate only. Samples of the treated and untreated papers thus prepared were installed as previously described on mineral agar, infected with the organisms and incubated at 30° C. for 7 days. At the end of this time the untreated paper showed profuse mould growth whereas the treated papers were free from mould.

EXAMPLE 15

A dye bath for woollen flannel was made up containing 5% pentachlorophenoxy isopropyl phosphate and containing also 10% sodium suphate and 2% sulphuric acid based on the dry weight of woollen flannel in the bath. Tests were then carried out on three groups of pieces of undyed woollen flannel. Group A were not immersed in the bath. Group B and C were immersed in the bath at a 30:1 liquor ratio at a temperature of 50° C. and raised to the boil and maintained there for 15 minutes with agitation. Group C was given five dry cleaning treatments in white spirit solvent. The initial pick up of pentachlorophenoxy isopropyl phosphate by groups B and C was 5% by weight.

All three groups were tested against *Tineola bisselliella* for 14 days at 75° F. using larvae 3 weeks old.

It was found that Group A (the untreated pieces) lost an average of 34.40 mg. in weight and there was no mortality amongst the larvae after the 14 days test periods.

Pieces of Group B at the end of the period were found to have lost 2.00 mg. in weight and all the larvae had died after the 14 days test period. The piece of Group C had lost 2.44 milligrams in weight and all the larvae had died by the end of the 14 day period.

The process carried out on Group B was repeated using 2½% isopropyl phosphate instead of 5% and mortality in this case in the 14 day period was found to be 90%.

EXAMPLE 16

A cotton plain weave fabric was treated with an aqueous dispersion of a mixture of 70 parts potassium pentachlorophenoxy isopropyl sulphate and 30 parts of the potassium salt of 2:4:6 trichlorophenoxy isopropyl sulphate to deposit 2% of the active ingredients on the weight of cloth by a conventional padding treatment. After drying, the treated fabric samples were, together with an untreated control, tested against fungal attack by burial beneath 4" of soil consisting of 1 part top soil, 1 part sand, 1 part well rotted horse manure and having a moisture content of 25 to 27% (based on dry weight) and a temperature of 28° C.

The results obtained were as follows:

|  | Strength tests in pounds | | |
|---|---|---|---|
|  | Original | After 7 days soil burial | After 14 days soil burial |
| Untreated fabric | 119 | 30 | 0 |
| Treated fabric | 110 | 109 | 98 |

EXAMPLE 17

A number of petri dish tests were conducted using three different articles, namely wheat starch, animal glue and ammonium caseinate, and five different biocides. In each case the sample was incubated on the surface of mineral agar plates. The five compounds used, and the results obtained, are as follows:

No. 1.—Phenoxy isopropyl sodium phosphate
No. 2.—Pentachlorophenoxy isopropyl ammonium sulphate
No. 3.—70/30 mixture of pentachlorophenoxy isopropyl potassium sulphate and o-benzyl-p-chlorophenoxy isopropyl potassium sulphate
No. 4.—Ortho phenyl phenoxy isopropyl potassium phosphite
No. 5.—Ortho phenyl phenoxy isopropyl sodium phosphate.

TABLE 1

| Biocide | Wheat starch 5% solution | Animal glue 5% solution | Ammonium caseinate 5% solution |
|---|---|---|---|
| NIL | P, B | P, B | P, B |
| 1% No. 1 | N, N$_B$ | N, N$_B$ | N, N$_B$ |
| 2% No. 1 | N, N$_B$ | N, N$_B$ | N, N$_B$ |
| 1% No. 2 | N, N$_B$ | N, N$_B$ | N, N$_B$ |
| 2% No. 2 | N, N$_B$ | N, N$_B$ | N, N$_B$ |
| 1% No. 3 | N, N$_B$ | N, N$_B$ | N, N$_B$ |
| 2% No. 3 | N, N$_B$ | N, N$_B$ | N, N$_B$ |
| 1% No. 4 | N, N$_B$ | N, N$_B$ | N, N$_B$ |
| 2% No. 4 | N, N$_B$ | N, N$_B$ | N, N$_B$ |
| 1% No. 5 | N, N$_B$ | N, N$_B$ | N, N$_B$ |
| 2% No. 5 | N, N$_B$ | N, N$_B$ | N, N$_B$ |

In this table:

P=profuse mould growth
N=no mould growth
B=bacterial odor
N$_B$=no bacterial odor

EXAMPLE 18

The effect of variations in pH upon the biocidal activity of compounds of the invention against various organisms was determined by the German Pretest method. Cereal dilutions are prepared using equal volumes of the biocide and double strength nutrient broth to which is added one drop of a one in ten dilution of a 16 hour old culture of the organism under test. After incubation at 37° C. for 48 hours the test plates were examined for growth or no growth and minimum concentrations of biocide at which growth is inhibited were recorded. The tests were repeated at three different pH values. The biocides tested were:

A=70% pentachlorophenoxy isopropyl ammonium sulphate, 30% trichlorophenoxy isopropyl ammonium sulphate
B=orthophenyl phenoxy isopropyl ammonium sulphite
C=o-benzyl-p-chlorophenoxy isopropyl ammonium sulphate
D=pentachlorophenoxy isopropyl ammonium sulphate The minimum inhibiting concentrations found at different pH values against various organisms are shown in Table 2 below.

TABLE 2

| | Biocide | | | | | | | | | | | |
|---|---|---|---|---|---|---|---|---|---|---|---|---|
| | A | | | B | | | C | | | D | | |
| pH | 3.0 | 6.7 | 9.0 | 5.0 | 5.3 | 9.0 | 5.0 | 7.1 | 9.0 | 5.0 | 7.1 | 9.0 |
| Organism: | | | | | | | | | | | | |
| S. choleraesius | | | | | | | <1/20 | <1/20 | <1/20 | 1/80 | 1/80 | 1/16 |
| Shig Sonné | | | | | | | <1/20 | <1/20 | <1/20 | 1/80 | 1/80 | 1/80 |
| E. coli | | | | | | | 1/20 | 1/40 | 1/80 | 1/320 | 1/320 | 1/2560 |
| Prot. vulgaris | 1/20 | 1/40 | 1/20 | 1/20 | 1/20 | 1/20 | <1/20 | <1/20 | 1/80 | 1/640 | 1/160 | 1/320 |
| Staph aureus | 1/640 | 1/640 | 1/640 | 1/640 | 1/640 | 1/1280 | 1/640 | 1/640 | 1/1280 | 1/1280 | 1/2560 | 1/5120 |
| Strep. faecalis | 1/320 | 1/640 | 1/320 | 1/320 | 1/640 | 1/520 | 1/640 | 1/320 | 1/1280 | 1/640 | 1/640 | 1/1280 |
| Sal. typhi | 1/40 | 1/20 | 1/40 | <1/20 | 1/20 | 1/20 | 1/40 | <1/20 | 1/40 | 1/160 | 1/160 | 1/640 |

We claim:

1. A method of preserving a wet article from biodegradation which comprises contacting a wet article with an aqueous solution or colloidal dispersion of a water soluble salt of an ester of sulphuric, orthophosphoric, pyrophosphoric or phosphorous acids in which at least one hydroxyl group in the acid is esterified by an aryloxy isopropanol group, and maintaining said contact between the wet article and the aqueous solution or colloidal dispersion of said water soluble salt.

2. A method according to claim 1 in which the article comprises textile fibres.

References Cited

UNITED STATES PATENTS

| 1,880,965 | 10/1932 | Lathrop et al. | 162—161 |
| 2,186,134 | 1/1940 | Chapman et al. | 162—161 |
| 2,401,261 | 5/1946 | Mac Mullen | 260—488 |
| 2,881,071 | 4/1959 | Buckman et al. | 162—161 |

FOREIGN PATENTS

| 1,000,662 | 8/1965 | Great Britain. |

WILLIAM D. MARTIN, Primary Examiner

T. G. DAVIS, Assistant Examiner

U.S. Cl. X.R.

117—138.5, 141, 142, 143 R; 162—161